United States Patent
Izuki

(10) Patent No.: US 7,947,618 B2
(45) Date of Patent: May 24, 2011

(54) OPTICAL GLASS AND OPTICAL ELEMENT

(75) Inventor: Manabu Izuki, Hyogo (JP)

(73) Assignee: Onica Minolta Opto, Inc., Tokyo (JP)

( * ) Notice: Subject to any disclaimer, the term of this patent is extended or adjusted under 35 U.S.C. 154(b) by 289 days.

(21) Appl. No.: 12/207,193

(22) Filed: Sep. 9, 2008

(65) Prior Publication Data
US 2009/0072422 A1   Mar. 19, 2009

(30) Foreign Application Priority Data

Sep. 13, 2007  (JP) ................. 2007-237857

(51) Int. Cl.
*C03C 3/068* (2006.01)
*C03C 3/062* (2006.01)
*C03C 3/064* (2006.01)
*C03C 3/066* (2006.01)

(52) U.S. Cl. ............. 501/78; 501/73; 501/77; 501/79

(58) Field of Classification Search ............ 501/73, 501/77, 78, 79
See application file for complete search history.

(56) References Cited

U.S. PATENT DOCUMENTS

| | | | | |
|---|---|---|---|---|
| 4,055,435 | A | * | 10/1977 | Sagara .................. 501/63 |
| 5,744,409 | A | | 4/1998 | Hashimoto et al. |
| 5,919,718 | A | * | 7/1999 | Hirota et al. ............ 501/64 |
| 6,776,007 | B2 | * | 8/2004 | Hirota et al. ............ 65/26 |

FOREIGN PATENT DOCUMENTS

| | | | | |
|---|---|---|---|---|
| JP | 2000-001329 | A | * | 1/2000 |
| JP | 2003089543 | | | 3/2003 |
| JP | 2004137145 | | | 5/2004 |

* cited by examiner

*Primary Examiner* — Jerry Lorengo
*Assistant Examiner* — Noah S Wiese
(74) *Attorney, Agent, or Firm* — Lucas & Mercanti, LLP

(57) ABSTRACT

An optical glass contains, based on a total weight of the optical glass: 12 to 30 weight percent of $P_2O_5$; 1 to 5 weight percent of $B_2O_3$; 1 to 8 weight percent of $Li_2O$; 0.5 to weight percent of $Na_2O$; 0.5 to 15 weight percent of $K_2O$; 1 to 5 weight percent of CaO; 0 to 20 weight percent of BaO; 0 to 5 weight percent of SrO; 1 to 10 weight percent of $TiO_2$; 1 to 20 weight percent of $Bi_2O_3$; 3 to 35 weight percent of $Nb_2O_5$; 13 to 60 weight percent of $WO_3$; and 0 to 1 weight percent of $Sb_2O_3$, wherein a total weight of $Na_2O$ and $K_2O$ is in a range of 3 to 20 weight percent based on the total weight of the optical glass.

10 Claims, 1 Drawing Sheet

OPTICAL GLASS AND OPTICAL ELEMENT

This application is based on Japanese Patent Application No. 2007-237857 filed on Sep. 13, 2007, in Japanese Patent office, the entire content of which is hereby incorporated by reference.

TECHNICAL FIELD

The present invention relates to optical glass and an optical element composed of the optical glass, and particularly relates to optical glass suitable for press molding process and an optical element produced by pressing the optical glass on a mold.

BACKGROUND

Optical elements composed of various kinds of optical glass are widely used for optical pickup lenses for discs such as CD, DVD, BD and HD-DVD, and used for image pickup lenses installed in portable telephones. Recently, demand to the optical element composed of such the optical glass is rapidly grown accompanied with the fast spreading of optical-disc recorder/player and portable telephone with camera. Consequently, rising in the production efficiency and lowering in the cost of the optical element is required.

In the optical disc recorder/player, increasing in the recording density and the volume of recorded information is rapidly progressed accompanied with the recent progress in information technology. It is necessary to raise the driving speed of the optical pickup lens by reducing the weight of the optical pickup lens for rapidly reading the information in the large capacity optical disc. Therefore, optical glass having low specific gravity is required.

Such the optical element can be produced by a press molding method. A method is known as a type of the press molding method in which a preformed glass having designated weight and shape is previously prepared and the preformed glass is reheated together with a mold and pressed on the mold to form the lens; hereinafter such the method is referred to as a reheat-press method.

As another type of the production method, the following method is known; hereinafter referred to as a drop-press molding method. In the method, a drop of molten glass is formed through a dropping nozzle, and the drop is dropped onto a mold and then is pressed for forming the lens during the solidification by cooling the molten glass drop. By this method, repetition of heating and cooling of the mold is not necessary and the formed glass can be directly produced from the molten glass drop. Therefore, the time for once forming the glass can be very shortened and higher production efficiency can be expected compared with the reheat-press method. Therefore, the method is remarkable.

As the optical glass to be used in the production of the optical element by the press molding method, having a refractive index nd (the refractive index for helium d line having a wavelength of 587.56 nm) from 1.56 to 1.63, and Abbe number vd from 56 to 63, documents such as U.S. Pat. No. 5,744,409 and JP-A Nos. 2003-89543 and 2004-137145 propose $SiO_2$—$B_2O_3$—$R_2O$—R'O—$La_2O_3$ type optical glass, where R is an alkali metal and R' is an alkali-earth metal.

However, the optical glasses described in U.S. Pat. No. 5,744,409 and JP-A Nos. 2003-89543 and 2004-137145 have very high thermal expansion coefficient such that the average thermal expansion coefficient α within the temperature range from 100 to 300° C. is not less than $90 \times 10^{-7}$. Therefore, such the glasses tend to cause a problem of occurrence of defect such as breaks and cracks because of heat shrinkage caused in a press-molding process. Particularly, in the case of the drop-press molding method, such the defects are considerably caused because the molten glass is rapidly cooled during pressing the drop dropped onto the mold.

Moreover, each of the optical glasses described in U.S. Pat. No. 5,744,409 and JP-A Nos. 2004-137145 has a viscosity suitable to drop a molten glass drop such as a viscosity of from 5 to 30 poises at a very high temperature. For instance, a temperature of 1,300° C. or more is required for making the viscosity of the molten glass drop to 5 poises. Therefore, the molten glass drop at such the high temperature causes considerable degradation of the mold when the drop contacts with the mold and the lifetime of the mold is much shorted, which is a problem.

Moreover, the optical glass described in JP-A No. 2003-89543 has high specific gravity such as 2.98. Consequently, such the glass hardly corresponds to the requirement of weight reduction of the optical element. Besides, the drop of the molten glass is released and dropped from the dropping nozzle when the amount of the molten glass accumulated at the end point of the dropping nozzle is arrived at the designated weight. Accordingly, a problem is also caused that the glass drop having large volume can be difficultly dropped when the specific gravity of the optical glass is high.

SUMMARY

The invention is attained on the above technical background and an object of the invention is to provide optical glass suitable for producing an optical element by the press-molding method.

Another object of the invention is to provide an optical element composed of such the optical glass and capable of being produced by the press molding method with high production efficiency.

The present invention provides an optical glass comprising, based on a total weight of the optical glass: 22 to 29 weight percent of $SiO_2$; 15 to 38 weight percent of $B_2O_3$; 0.1 to 8 weight percent of $Al_2O_3$; 2 to 10 weight percent of $Li_2O$; 1 to 9 weight percent of BaO; 5 to 20 weight percent of $La_2O_3$; 0.5 to 4 weight percent of $Nb_2O_5$; 0 to 5 weight percent of $Na_2O$; 0 to 5 weight percent of $K_2O$; 0 to 10 weight percent of CaO; 0 to 5 weight percent of SrO; 0 to 2 weight percent of ZnO; 0 to 5 weight percent of $ZrO_2$; 0 to 5 weight percent of $WO_3$; 0 to 5 weight percent of $Ta_2O_5$; 0 to 10 weight percent of $Yb_2O_3$; and 0 to 1 weight percent of $Sb_2O_3$, wherein a weight ratio of $SiO_2$ and $B_2O_3$ ($SiO_2/B_2O_3$) is in a range of 0.7 to 1.5.

These and other objects, features and advantages according to the present invention will become more apparent upon reading of the following detailed description along with the accompanied drawings.

BRIEF DESCRIPTION OF THE DRAWING

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

Figure 1:
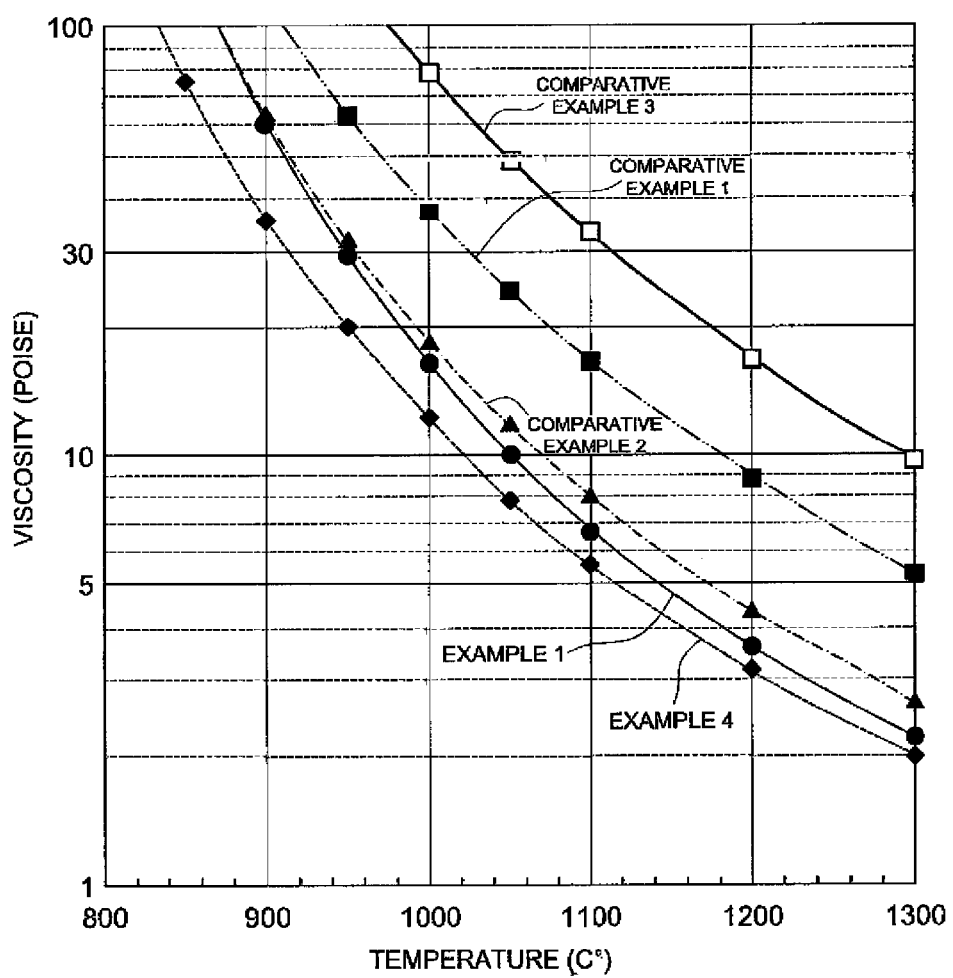
FIG. 1 is a graph showing the viscosity curves.

An optical glass as a preferred embodiment of the present invention contains the predetermined components, so the optical glass can have a refractive index nd from 1.56 to 1.63, an Abbe number vd from 56 to 63, a specific gravity not more than 2.9, an average thermal expansion coefficient α not more than $87 \times 10^{-7}/K$ at a temperature in the range of 100° C. to 300° C., a liquid phase temperature $TL < T_{(30P)}$ and $T_{(5P)} \leq 1,200°$ C. In the above and the following description, $T_{(30P)}$ is the temperature at which the optical glass has the viscosity of 30 poises and $T_{(5P)}$ is the temperature at which the optical glass has the viscosity of 5 poises. Consequently, the optical element can be produced at high production efficiency by the press-molding method, and at particularly high production efficiency by the drop-press molding method.

(Composition of Glass)

The optical glass of the preferred embodiment has a $SiO_2$—$B_2O_3$—$Li_2O$—$BaO$—$La_2O_3$ type composition and properties suitable for press molding since it contains each component in predetermined ratio. Each of the components contained in the optical glass of the embodiment is described below.

$SiO_2$ is a major component of the optical glass of the embodiment and largely contributes to the durability of the glass since it is an important component for forming the network structure. When the content of $SiO_2$ is less than 22 weight percent, the chemical durability of the glass tends to be lowered. When the content exceeds 29 weight percent, not only the melting property is deteriorated but the suitability to the drop-press molding is lost since $T_{(5P)}$ is raised by 1,200° C. or more. Accordingly, the content of $SiO_2$ should be within the range of 22 to 29 weight percent. Within such the range, 25 to 29 weight percent of $SiO_2$ is more preferable.

$B_2O_3$ is also major component of the optical glass of the embodiment, which contributes to the stability of the glass. When the content of $B_2O_3$ is less than 15 weight percent, the liquid phase temperature LT is raised so as to tend to cause devitrification. When the content exceeds 38 weight percent, the chemical durability is lowered. Therefore, the content of $B_2O_3$ should be within the range of 15 to 38 weight percent, and 25 to 38 weight percent of $B_2O_3$ is more preferable.

In the embodiment, it is necessary to make the weight ratio of $SiO_2$ and $B_2O_3$ ($SiO_2/B_2O_3$) from 0.7 to 1.5. The viscosity curve suitable for the drop-press molding can be difficultly obtained when the ratio is less than 0.7 and more than 1.5. The viscosity curve suitable for drop-press molding means that the viscosity curve satisfied the conditions of liquid phase temperature $TL < T_{(30P)}$ and $T_{(5P)} \leq 1,200°$ C. When the weight ratio is less than 0.7, the chemical durability of the glass is lowered. When the weight ratio is more than 1.5, the melting ability of the glass is reduced and the anti-devitrification ability of the glass is deteriorated so that uniform glass can be difficultly obtained. Therefore, the weight ratio of $SiO_2$ and $B_2O_3$ ($SiO_2/B_2O_3$) should be within the range of 0.7 to 1.5, and the range is more preferably from 0.8 to 1.2.

$Al_2O_3$ is an essential component of the optical glass of the embodiment, by which the chemical durability can be increased and the viscosity of the glass can be controlled. Such the effects are hardly be obtained when the content of $Al_2O_3$ is less than 0.1 weight percent, and liquid phase temperature is raised and the tendency of devitrification is increased so that the condition of liquid phase temperature $TL < T_{(5P)}$ is not satisfied when the content exceeds 8 weight percent. Therefore, the content of $Al_2O_3$ should be within the range of 0.1 to 8 weight percent, and the range is more preferably from 2 to 7 weight percent.

$Li_2O$ is an essential component of the optical glass of the embodiment, by which glass is stabilized and the glass transition temperature Tg and the specific gravity can be lowered Such the effects are hardly obtained when the content of $Li_2O$ is less than 2 weight percent and the chemical durability is deteriorated and the viscosity is lowered when the content is more than 10 weight percent. Therefore, the content of $Li_2O$ should be within the range of 2 to 10 weight percent and the range is more preferably from 4 to 7 weight percent.

BaO is an essential component of the optical glass of the embodiment, which largely contributes to the stability of the glass and can be applied for controlling the optical factors such as refractive index nd and Abbe number vd. The stabilizing effect to the glass becomes insufficient when the content of BaO is less than 1 weight percent, and the specific gravity is increased and the chemical durability is deteriorated when the content exceeds 9 weight percent. Accordingly, the content of BaO should be within the range of 1 to 9 weight percent, and the range is more preferably from 6 to 9 weight percent.

$La_2O_3$ is an essential component of the glass of the embodiment and has effects of raising the refractive index nd and improving the chemical durability of the glass while holding low dispersion When the content of $La_2O_3$ is less than 5 weight percent, the refractive index nd is lowered so as to difficultly obtain the desired optical constants and the chemical durability is deteriorated. When the content exceeds 20 weight percent, the refractive index nd is increased so that the desired optical constants are difficultly obtained and the liquid phase temperature TL is raised and the tendency to be devitrified is raised and the specific gravity is also increased. Therefore, the content of $La_2O_3$ should be within the range of 5 to 20 weight percent. It is preferable that the content of $La_2O_3$ is within the range of 8 to 15 weight percent from the view point of the specific gravity since the optical glass of the embodiment simultaneously contains BaO and $La_2O_3$.

$Nb_2O_5$ is an essential component of the optical glass of the embodiment and has effects of raising the chemical durability, stability and refractive index. These effects are low when the content of $Nb_2O_5$ is less than 0.5 weight percent. When the content of $Nb_2O_5$ is more than 4 weight percent, the Abbe number vd is made too low so that the desired optical constants are hardly obtained. Therefore, the content of $Nb_2O_5$ should be within the range of 0.5 to 4 weight percent and the range is more preferably from 0.5 to 2 weight percent.

Moreover, $Na_2O$, $K_2O$, CaO, SrO, ZnO, $ZrO_2$, $WO_3$, $Ta_2O_5$, $Yb_2O_3$ and $Sb_2O_3$ each may be added in a predetermined ratio as an optional component into the optical glass of the embodiment. Each of these components is described below.

$Na_2O$ and $K_2O$ each deteriorates the chemical durability of the glass similarly to $Li_2O$ when the content of it is more than 5 weight percent though they show an effect of lowering the glass transition temperature Tg. Therefore, the each content of $Na_2O$ and $K_2O$ should be within the range of 0 to 5 weight percent (including 0), and the range is more preferably from 0 to 2 weight percent.

CaO is a component showing effects of controlling the refractive index nd, stabilizing and reducing weight of the glass and improving the meting ability but the tendency of lowering the chemical durability is revealed when the content of it exceeds 10 weight percent. The content of CaO should be within the range of from 0 to 10 weight percent (including 0) and is more preferably from 0 to 8 weight percent.

SrO can be contained until 5 weight percent for controlling the refractive index nd. When the content is more than 5 weight percent, the specific gravity and the tendency to devitrify is increased. The content of SrO should be within the range of from 0 to 2 weight percent (including 0).

ZnO shows effects of improving weather resistance, controlling the refractive index and lowering the glass transition temperature Tg, but the liquid phase temperature is raised and the tendency to devitrify is increased. Therefore, the content of ZnO is from 0 to 2 weight percent (including 0).

The chemical durability can be raised and the refractive index nd can be controlled by addition of small amount of $ZrO_2$, but the content of which of more than 5 weight percent causes increasing in the tendency to be devitrified and lowering in the Abbe number vd so that the desired optical contents can be difficultly obtained. Therefore, the content of $ZrO_2$ is within the range of 0 to 5 weight percent (including 0), and the range is more preferably from 0 to 2 weight percent.

$WO_3$ contributes to stabilization of the glass and is applicable for controlling the refractive index nd. However, when the content exceeds 5 weight percent, it causes the problems: the Abbe number vd is lowered, desired optical constants are difficultly obtained, coloring is caused and the specific gravity is increased. Therefore, the content of $WO_3$ is within the range of 0 to 5 weight percent (including 0), and the range is more preferably from 0 to 3 weight percent.

$Ta_2O_5$ can be contained in an amount of not more than 5 weight percent for stabilizing the glass and controlling the refractive index nd. When the content exceeds 5 weight percent, the Abbe number vd is lowered and the desired optical constants are difficultly obtained. Therefore, the content of $Ta_2O_5$ is within the range of 0 to 5 weight percent (including 0), and is more preferably from 0 to 3 weight percent.

$Yb_2O_3$ can be contained in an amount of not more than 10 weight percent for improving the chemical durability and controlling the refractive index nd. When the content exceeds 10 weight percent, tendency to devitrify and the specific gravity are increased. Therefore, the content of $Yb_2O_3$ is within the range of 0 to 10 weight percent (including 0), and the range is more preferably from 0 to 5 weight percent.

$Sb_2O_3$ can be used as a clearing agent. The content of $Sb_2O_3$ in the embodiment is from 0 to 1 weight percent (including 0).

The optical glass of the embodiment has a refractive index nd from 1.56 to 1.63, an Abbe number vd from 56 to 63, a specific gravity not more than 2.9, and an average thermal expansion coefficient of not more than $87 \times 10^{-7}$/K at a temperature in the range of 100° C. to 300° C., and the condition of the liquid phase temperature satisfies $TL < T_{(30P)}$ and $T_{(5P)} \leq 1,200°$ C., because the glass contains the above-described glass components.

(Press-Molding)

The optical element of the embodiment is produced by pressing the above optical glass on a mold to form a body of the optical element. As described above, the optical glass of the embodiment has the properties suitable for the press-molding method so that the optical element can be produced at high production efficiency by the press-molding method. The optical element can be produced at particular high production efficiency by the drop-press molding method though the press-molding method may be either the heat-press method or the drop-press molding method. The production method of the glass element composed of the optical glass of the embodiment is described below according to the example of the drop-press molding method.

The drop-press molding method is a press-molding method in which the glass is melted and dropped from a dropping nozzle controlled in the temperature onto a previously heated mold and then precisely pressed by a pair of upper and lower molds.

The mold is previously heated for suitably transferring the optical surface to the optical element. The temperature is usually set near the glass transition temperature Tg of the optical glass, for example from Tg−50° C. to Tg+50° C., though the temperature differs depending on the various conditions such as the shape and size of the optical element. Accordingly, it is necessary that the heating temperature of the mold is raised accompanied with rising in the glass transition temperature Tg of the optical glass so that the deterioration of the mold is accelerated. The glass transition temperature of the optical glass is preferably not more than 550° C. from the view point of inhibition of the deterioration of the mold.

The material of the mold can be selected from materials known as the mold for press-molding an optical element composed of glass, for example, a heat resistive alloy such as stainless steel, an ultra hard material principally composed of tungsten carbide, various ceramics such as silicone carbide, silicone nitride and aluminum nitride and a composite material containing carbon. Materials having a protective layer formed by various metals, ceramics or carbon on the surface thereof can also be used.

The drop of molten glass is naturally released and dropped from the dropping nozzle when the weight of the molten glass accumulated at the end of the nozzle is reached at a designated value. Usually, a drop of about 0.1 to 2 g can be dropped. The optical glass of the embodiment can correspond to production of an optical element having large volume since the specific gravity of the glass is very low such as not more than 2.9.

On the occasion of dropping the molten glass from the dropping nozzle, it is necessary to suitably control the viscosity of the molten glass drop within the range of from 5 to 30 poises according to the outer diameter and weight of the optical element to be produced. The temperature of the drop of the molten glass (temperature at which the viscosity is made to 5 to 30 poises) on such the occasion should be higher than the liquid phase temperature of the glass for preventing the devitrification but the deterioration of mold is accelerated when the temperature is more than 1,200° C. The devitrification on the occasion of dropping can be prevented and the deterioration of the mold can be effectively inhibited because the relations of the liquid phase temperature $TL < T_{(30P)}$ and $T_{(5P)} \leq 1,200°$ C. are satisfied in the optical glass of the embodiment.

The molten glass drop may be dropped from the dropping nozzle to hit to a member having a fine through hole, instead of being dropped directly onto the mold, so that a part of the molten glass drop which hit the member passes through the fine through hole to form a fine droplet and dropped onto the mold. A fine optical element such as 1 $mm^3$ to 100 $mm^3$ can be produced by such the method. Such the method is preferable because many kinds of optical element can be produced at high efficiency since the volume of the molten glass drop can be controlled by changing the diameter of the fine through hole without changing of the dropping nozzle. This method is described in JP-A No. 2002-154834.

The molten glass drop dropped onto the mold is formed into an element body of the optical element by pressing the drop by the pair of upper and lower molds. The molten glass drop is rapidly cooled and solidified into the body of the optical element during pressing the drop by the molds with being cooled through the contacting surface with the molds. Consequently, the defect such as breaks or cracks is easily caused by the thermal shrinking on the occasion of the press-molding when a glass having high thermal expansion coefficient is used. In the embodiment, such the occurrence of the defect caused by the thermal shrinking can be effectively inhibited because the thermal expansion coefficient of the optical glass of the embodiment at temperature in the range of from 100° C. to 300° C. is not more than $87 \times 10^{-7}$/K.

The pressure and the time for the pressing may be suitably decided according to the size of the optical element to be produced. Usually, the pressure for pressing about from 200 to 1,000 kgf/cm² and the pressing time from several seconds to several tens seconds are suitable.

EXAMPLES

Four kinds of optical glass including the glass compositions of the embodiment: Examples 1 to 4, and three kinds of optical glass excluding the glass compositions of the embodiment: Comparative Examples 1 to 3, were prepared and physical properties of them were measured. The physical properties of Examples 1 to 4 and those of Comparative Examples 1 to 3 are each listed in Tables 1 and 2, respectively. As can be seen when comparing the glass compositions of Example 1 to 4 with Comparative Example 1 to 3, the glass composition of Examples 1 to 4 has a feature that the content of $SiO_2$ and the ratio of $SiO_2$ and $B_2O_3$ ($SiO_2/B_2O_3$) is lower than those in Comparative Examples 1 to 3. Comparative Example 1 was a reexamination of Example 11 described in the above described JP-A No. 2004-137145, Comparative Example 2 was an reexamination of Example 11 described in the above described JP-A No. 2003-89543, and Comparative Example was an reexamination of Example 8 in the above described U.S. Pat. No. 5,744,409.

TABLE 1

| | | Example 1 | Example 2 | Example 3 | Example 4 |
|---|---|---|---|---|---|
| Glass composition (weight percent) | $SiO_2$ | 29.0 | 29.0 | 29.0 | 29.0 |
| | $B_2O_3$ | 32.0 | 32.0 | 32.0 | 35.0 |
| | ($SiO_2/B_2O_3$) | 0.9 | 0.9 | 0.9 | 0.8 |
| | $Al_2O_3$ | 5.0 | 5.0 | 5.0 | 5.5 |
| | $Li_2O$ | 5.5 | 5.5 | 5.5 | 7.0 |
| | BaO | 9.0 | 7.0 | 9.0 | 9.0 |
| | $Nb_2O_5$ | 0.5 | 0.5 | 0.5 | 0.5 |
| | $La_2O_3$ | 14.0 | 14.0 | 13.0 | 12.0 |
| | $Na_2O$ | 0 | 0 | 0 | 0 |
| | $K_2O$ | 0 | 0 | 0 | 0 |
| | CaO | 4.0 | 5.0 | 4.0 | 2.0 |
| | SrO | 0 | 0 | 0 | 0 |
| | ZnO | 1.0 | 2.0 | 1.0 | 0 |
| | $ZrO_2$ | 0 | 0 | 0 | 0 |
| | $WO_3$ | 0 | 0 | 0 | 0 |
| | $Ta_2O_5$ | 0 | 0 | 0 | 0 |
| | $Yb_2O_3$ | 0 | 0 | 1.0 | 0 |
| | $Sb_2O_3$ | 0.05 | 0.05 | 0.05 | 0.10 |
| Physical property | Refractive index nd | 1.5938 | 1.5958 | 1.5949 | 1.5837 |
| | Abbe number νd | 59.68 | 60.61 | 60.89 | 61.32 |
| | Tg (° C.) | 534 | 531 | 539 | 529 |
| | At (° C.) | 581 | 577 | 581 | 583 |
| | α(at 100-300° C.) (×10⁻⁷/K) | 72 | 73 | 74 | 84 |
| | Liquid phase temperature TL (° C.) | 920 | 920 | 900 | 880 |
| | Specific gravity | 2.86 | 2.86 | 2.88 | 2.77 |
| | $T_{(30P)}$ (° C.) | 950 | 940 | 950 | 920 |
| | $T_{(5P)}$ (° C.) | 1150 | 1120 | 1140 | 1120 |

TABLE 2

| | | Comparative Example 1 | Comparative Example 2 | Comparative Example 3 |
|---|---|---|---|---|
| Glass composition (weight percent) | $SiO_2$ | 49.1 | 39.8 | 50.7 |
| | $B_2O_3$ | 12.1 | 17.5 | 13.4 |
| | ($SiO_2/B_2O_3$) | 4.1 | 2.3 | 3.8 |
| | $Al_2O_3$ | 1.4 | 1.5 | 3.6 |
| | $Li_2O$ | 7.5 | 6.6 | 7.4 |
| | BaO | 8.0 | 7.8 | 16.5 |
| | $Nb_2O_5$ | 0 | 0 | 0 |
| | $La_2O_3$ | 10.3 | 17.0 | 2.0 |
| | $Na_2O$ | 3.6 | 2.1 | 1.0 |
| | $K_2O$ | 0 | 0 | 3.4 |
| | CaO | 0 | 5.5 | 0 |
| | SrO | 7.8 | 2.1 | 0 |
| | ZnO | 0 | 0 | 2.0 |
| | $ZrO_2$ | 0 | 0 | 0 |
| | $WO_3$ | 0 | 0 | 0 |
| | $Ta_2O_5$ | 0 | 0 | 0 |
| | $Yb_2O_3$ | 0 | 0 | 0 |
| | $Sb_2O_3$ | 0.20 | 0.10 | 0.20 |
| Physical property | Refractive index nd | 1.5739 | 1.6016 | 1.5628 |
| | Abbe number νd | 60.34 | 59.15 | 61.51 |
| | Tg (° C.) | 500 | 517 | 497 |
| | At (° C.) | 553 | 564 | 548 |
| | α (at 100-300° C.) (×10⁻⁷/K) | 92 | 95 | 90 |
| | Liquid phase temperature TL (° C.) | 770 | 860 | 800 |
| | Specific gravity | 2.87 | 2.98 | 2.78 |
| | $T_{(30P)}$ (° C.) | 1040 | 960 | 1120 |
| | $T_{(5P)}$ (° C.) | More than 1,300° C. | 1180 | More than 1,300° C. |

The optical glass was produced by a usual melt process. Firstly, a raw material composed of oxide, hydroxide, carbonate or nitrate of each components were weighed and mixed in designated ratio. Thus prepared raw material powder was put into a platinum melting pod and melted spending 2 to 3 hours in a melting furnace heated at a temperature of from 1,200° C. to 1,400° C. The molten glass was stirred and uniformed and then poured into a mold previously heated at a temperature near the glass transition temperature Tg of the glass. The glass poured in the mold was inserted in an electric furnace heated at a temperature near the glass transition temperature Tg−20° C. and gradually cooled to prepare a plate shaped sample glass.

The methods for measuring the physical propertied listed in Tables 1 and 2 are described below. The refractive index nd and the Abbe number νd were measured after the glass is melted and is gradually cooled to room temperature at a cooling rate of −30° C. per hour. The measurements were carried out by using a measuring apparatus KPR-200 manufactured by Kalnew Optical Industrial Co., Ltd. The glass transition temperature Tg, yield temperature At and average thermal expansion coefficient α within the temperature range of from 100° C. to 300° C. were the values each measured by a thermal expansion measuring apparatus at a temperature rising rate of 5° C. per minute. A measuring apparatus TMA/SS-6000 manufactured by Seiko Instruments Inc. was used for the measurements. The specific gravity was measured by Archimedes's method. The liquid phase temperature TL was determined by following method; the glass was put into a 50 ml melting pod and melted for 1 hour in a melting furnace heated at a temperature of from 1,200° C. to 1,400° C. and then cooled to a designated temperature and held for 12 hours. After that, the glass was taken out from the melting furnace and poured into a mold. Glass sample obtained by gradually cooling was polished for making a mirror surface and the presence of devitrification (crystals) in the sample was observed by an optical microscope.

A graph of viscosity curves of optical glasses is shown in FIG. 1. The measurements of viscosity at various temperatures were carried out by a high temperature viscometer VISCOMETER TV-20. The graphs as to Examples 2 and 3 are omitted since they are almost the same as that of Example 1.

As can be seen from FIG. 1, the optical glasses of Examples 1 to 4 have a refractive index of 1.56 to 1.63, an Abbe number vd from 56 to 63, a specific gravity of not more than 2.9 and an average thermal expansion coefficient α of not more than $87 \times 10^{-7}$/K at a temperature in the range of from 100° C. to 300° C., and the relation of the liquid phase temperature TL satisfied $TL < T_{(30P)}$ and $T_{(5P)} \leq 1,200°$ C. Consequently, it was confirmed that the glasses of the embodiment have designated optical constants and is suitable for producing the optical element by the press molding method, particularly by the drop-press molding method.

Contrary to that, the optical glasses of Comparative Examples 1 to 3 are large as not less than $90 \times 10^{-7}$/K in the average thermal expansion coefficient α at the temperature in the range of from 100° C. to 300° C. Therefore, the defects such as breaks and cracks tend to be caused in the press-molding process. Thus, the production of optical element at high production efficiency by the press molding method is hardly carried out by the use of such the glasses.

In the optical glasses of Comparative Examples of 1 and 3, the viscosity curves are shifted to upper side (high viscosity side) in FIG. 1 compared with Examples 1 to 4. Accordingly, it is necessary to set the temperature of the dropping nozzle at higher temperature. Particularly, $T_{(5P)}$ is higher than 1,300° C. Consequently, the temperature of molten glass to be dropped onto the mold becomes very high and the deterioration of the mold is considerably accelerated when the optical element is produced by the drop-press molding method.

The specific gravity of Comparative Example 2 is 2.98 which is larger than those of Examples 1 to 4. The high specific gravity is caused by that BaO is contained in some degree and $La_2O_3$ is contained in large amount. Accordingly, such the glass is difficult to cope with the weight reduction of the optical element sufficiently, and to form a molten glass drop with a large volume.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. An optical glass comprising, based on a total weight of the optical glass:
   22 to 29 weight percent of $SiO_2$;
   15 to 38 weight percent of $B_2O_3$;
   0.1 to 8 weight percent of $Al_2O_3$;
   2 to 10 weight percent of $Li_2O$;
   1 to 9 weight percent of BaO;
   5 to 20 weight percent of $La_2O_3$;
   0.5 to 4 weight percent of $Nb_2O_5$;
   0 to 5 weight percent of $Na_2O$;
   0 to 5 weight percent of $K_2O$;
   0 to 10 weight percent of CaO;
   0 to 5 weight percent of SrO;
   0 to 2 weight percent of ZnO;
   0 to 5 weight percent of $ZrO_2$;
   0 to 5 weight percent of $WO_3$;
   0 to 5 weight percent of $Ta_2O_5$;
   0 to 10 weight percent of $Yb_2O_3$; and
   0 to 1 weight percent of $Sb_2O_3$,
   wherein a weight ratio of $SiO_2$ and $B_2O_3$ ($SiO_2/B_2O_3$) is in a range of 0.8 to 1.2,
   the optical glass has a refractive index nd in a range of 1.56 to 1.63, where the refractive index nd is a refractive index for helium d line (wavelength of 587.56 nm),
   an Abbe number vd in a range of 56 to 63,
   a specific gravity not larger than 2.9,
   an average thermal expansion coefficient a not larger than $87 \times 10^{-7}$/K at a temperature in a range of 100° C. to 300° C., and
   a liquid phase temperature TL satisfying
   $T_L < T_{(30P)}$ and $T_{(5P)} \leq 1200°$ C.
   where $T_{(30P)}$ is a temperature at which the optical glass has a viscosity of 30 poises and $T_{(5P)}$ is a temperature at which the optical glass has a viscosity of 5 poises.

2. The optical glass of claim 1, wherein the optical glass comprises 25 to 29 weight percent of $SiO_2$ based on a total weight of the optical glass.

3. The optical glass of claim 1, wherein the optical glass comprises 25 to 35 weight percent of $B_2O_3$ based on a total weight of the optical glass.

4. The optical glass of claim 1, wherein the optical glass comprises 2 to 7 weight percent of $Al_2O_3$ based on a total weight of the optical glass.

5. The optical glass of claim 1, wherein the optical glass comprises 4 to 7 weight percent of $Li_2O$ based on a total weight of the optical glass.

6. The optical glass of claim 1, wherein the optical glass comprises 6 to 9 weight percent of BaO based on a total weight of the optical glass.

7. The optical glass of claim 1, wherein the optical glass comprises 8 to 15 weight percent of $La_2O_3$ based on a total weight of the optical glass.

8. The optical glass of claim 1, wherein the optical glass comprises 0.5 to 2 weight percent of $Nb_2O_5$ based on a total weight of the optical glass.

9. An optical element comprising an element body comprising the optical glass of claim 1.

10. An optical element of claim 9, wherein the element body is formed by pressing a drop of the optical glass which has been melted and dropped on a mold.

* * * * *